US008175830B2

(12) United States Patent  
Hosking

(10) Patent No.: US 8,175,830 B2
(45) Date of Patent: May 8, 2012

(54) FREQUENCY ESTIMATION OF RARE EVENTS BY ADAPTIVE THRESHOLDING

(75) Inventor: Jonathan R. Hosking, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 12/262,984

(22) Filed: Oct. 31, 2008

(65) Prior Publication Data

US 2010/0114526 A1    May 6, 2010

(51) Int. Cl.
    *G01R 23/00*    (2006.01)
(52) U.S. Cl. .......... 702/75; 702/179; 702/180; 702/181; 702/193
(58) Field of Classification Search ........... 702/179–182
    See application file for complete search history.

(56) References Cited

U.S. PATENT DOCUMENTS

| 7,409,357 | B2 * | 8/2008 | Schaf et al. ................ 705/7.28 |
| 2003/0149657 | A1 * | 8/2003 | Reynolds et al. ............. 705/38 |
| 2008/0104006 | A1 * | 5/2008 | Kiefer ........................ 706/48 |

OTHER PUBLICATIONS

Weissman, Ishay, "Estimation of Parameters and Large Quantiles Based on the k Largest Observations", 1978, Journal of the American Statistical Association, 73, 812-815.*
Afshartous, D. and Preston, R., Confidence intervals for dependent data: Equating non-overlap with statistical significance, Apr. 24, 2010, Computational Statistics and Data Analysis, 54, 2296-2305.*
Gomes et al., "A Sturdy Reduced-Bias Extreme Quantile (VaR) Estimator", Journal of the American Statistical Association, Mar. 2007,, pp. 280-292, vol. 102, No. 477, American Statistical Association.
Guillou et al., "A diagnostic for selecting the threshold in extreme value analysis", J.R. Statist. Soc. B Part 2, 2001, pp. 293-305, Royal Statistical Society.
Hosking "L-moments: Analysis and Estimation of Distributions using Linear Combinations of Order Statistics", J.R. Statist, Soc. B, 1990, pp. 105-124, 52, No. 1, Royal Statistical Society.
e-Handbook of Statistical Methods, National Institute of Standards and Technology, Jun. 2003—Last Update Jul. 18, 2006.

* cited by examiner

*Primary Examiner* — Drew A Dunn
*Assistant Examiner* — Mischita Henson
(74) *Attorney, Agent, or Firm* — Scully, Scott, Murphy & Presser, P.C.; Daniel P. Morris, Esq.

(57) ABSTRACT

A method and system for estimating a magnitude of extremely rare events upon receiving a complete data sample and a specific exceedance probability are described. A distribution is chosen for a complete data sample. An optimal subsample fitted to the distribution is obtained. The optimal subsample is a largest acceptable subsample. A subsample is considered as an acceptable subsample when a goodness-of-fit test on the subsample is satisfactory (i.e., higher than a predetermined threshold). In addition, if a tail measure of an acceptable subsample lies outside a confidence interval of any smaller acceptable subsample, the acceptable subsample is considered as an unacceptable. Based on the optimal subsample and an inputted exceedance probability, a quantile estimate is computed, e.g., by executing an inverse of a cumulative distribution function of generalized Pareto distribution.

20 Claims, 5 Drawing Sheets

| $p$ | $n$ | $\xi$ | $\alpha$ | $k$ | $U$ | $L$ | $G$ | Fit | Q3 | Q4 | Q5 | Q6 |
|---|---|---|---|---|---|---|---|---|---|---|---|---|
| 0.2500 | 1172 | 54.1 | 18.1 | -0.119 | -0.055 | -0.183 | 0.81 | 1 | 196 | 289 | 411 | 573 |
| 0.2272 | 1065 | 56.0 | 17.9 | -0.135 | -0.067 | -0.202 | 0.91 | 1 | 199 | 300 | 437 | 625 |
| 0.2066 | 968 | 57.6 | 18.4 | -0.123 | -0.053 | -0.193 | 0.85 | 1 | 197 | 292 | 419 | 587 |
| 0.1878 | 880 | 59.3 | 18.8 | -0.120 | -0.047 | -0.194 | 0.81 | 1 | 196 | 290 | 414 | 578 |
| 0.1707 | 800 | 61.5 | 17.9 | -0.156 | -0.077 | -0.235 | 0.90 | 1 | 203 | 314 | 473 | 702 |
| 0.1552 | 727 | 63.3 | 18.0 | -0.160 | -0.077 | -0.244 | 0.85 | 1 | 203 | 316 | 481 | 718 |
| 0.1411 | 661 | 65.0 | 18.4 | -0.156 | -0.069 | -0.242 | 0.67 | 1 | 202 | 313 | 472 | 699 |
| 0.1282 | 601 | 67.2 | 17.7 | -0.186 | -0.092 | -0.279 | 0.53 | 1 | 207 | 333 | 527 | 824 |
| 0.1166 | 546 | 68.8 | 18.4 | -0.176 | -0.079 | -0.273 | 0.71 | 1 | 205 | 326 | 508 | 780 |
| 0.1060 | 497 | 70.2 | 19.5 | -0.150 | -0.050 | -0.250 | 0.91 | 1 | 202 | 310 | 464 | 681 |
| 0.0963 | 451 | 72.2 | 19.6 | -0.156 | -0.051 | -0.262 | 0.81 | 1 | 203 | 314 | 474 | 704 |
| 0.0876 | 410 | 73.4 | 22.0 | -0.093 | 0.012 | -0.200 | 0.87 | 1 | 196 | 282 | 389 | 522 |
| 0.0796 | 373 | 75.6 | 22.0 | -0.101 | 0.010 | -0.212 | 0.82 | 1 | 196 | 285 | 397 | 539 |
| 0.0724 | 339 | 77.6 | 22.5 | -0.092 | 0.024 | -0.209 | 0.42 | 1 | 196 | 281 | 388 | 519 |
| 0.0658 | 308 | 80.1 | 21.5 | -0.127 | -0.002 | -0.252 | 0.21 | 1 | 199 | 297 | 429 | 606 |
| 0.0598 | 280 | 82.9 | 19.3 | -0.198 | -0.059 | -0.336 | 0.23 | 1 | 205 | 332 | 532 | 849 |
| 0.0544 | 255 | 84.9 | 19.3 | -0.208 | -0.062 | -0.355 | 0.29 | 1 | 205 | 337 | 550 | 895 |
| 0.0494 | 231 | 86.2 | 21.7 | -0.153 | -0.006 | -0.300 | 0.49 | 1 | 202 | 311 | 466 | 688 |
| 0.0449 | 210 | 88.1 | 22.6 | -0.136 | 0.015 | -0.288 | 0.58 | 1 | 201 | 304 | 445 | 637 |
| 0.0408 | 191 | 90.0 | 23.7 | -0.115 | 0.042 | -0.272 | 0.64 | 1 | 199 | 295 | 420 | 583 |
| 0.0371 | 174 | 92.2 | 23.9 | -0.116 | 0.048 | -0.280 | 0.69 | 1 | 199 | 296 | 421 | 585 |
| 0.0337 | 158 | 94.4 | 24.7 | -0.101 | 0.070 | -0.273 | 0.76 | 1 | 199 | 290 | 406 | 552 |
| 0.0307 | 144 | 96.4 | 26.0 | -0.074 | 0.103 | -0.252 | 0.89 | 1 | 198 | 282 | 383 | 502 |
| 0.0279 | 130 | 98.9 | 26.4 | -0.070 | 0.116 | -0.258 | 0.84 | 1 | 198 | 282 | 380 | 496 |
| 0.0253 | 119 | 100.7 | 28.5 | -0.026 | 0.166 | -0.220 | 0.73 | 1 | 197 | 270 | 349 | 433 |
| 0.0230 | 108 | 104.0 | 26.8 | -0.065 | 0.139 | -0.270 | 0.33 | 1 | 197 | 280 | 375 | 487 |
| 0.0209 | 98 | 106.3 | 31.4 | 0.037 | 0.249 | -0.174 | 0.13 | 1 | 195 | 257 | 314 | 367 |
| 0.0190 | 89 | 107.9 | 33.0 | 0.075 | 0.299 | -0.147 | 0.06 | 1 | 195 | 250 | 297 | 337 |
| 0.0173 | 81 | 109.4 | 38.6 | 0.202 | 0.443 | -0.038 | 0.00 | 0 | 193 | 233 | 258 | 273 |
| 0.0157 | 73 | 114.7 | 32.5 | 0.082 | 0.328 | -0.164 | 0.12 | 1 | 194 | 249 | 294 | 331 |
| 0.0143 | 67 | 119.7 | 25.1 | -0.084 | 0.177 | -0.346 | 0.53 | 1 | 194 | 275 | 372 | 490 |
| 0.0130 | 61 | 123.0 | 22.2 | -0.165 | 0.122 | -0.453 | 0.31 | 1 | 194 | 289 | 429 | 633 |
| 0.0118 | 55 | 126.7 | 18.5 | -0.279 | 0.069 | -0.628 | 0.34 | 1 | 192 | 311 | 539 | 971 |
| 0.0107 | 50 | 128.7 | 18.5 | -0.292 | 0.082 | -0.667 | 0.41 | 1 | 192 | 314 | 553 | 1021 |

FIG. 5

FREQUENCY ESTIMATION OF RARE EVENTS BY ADAPTIVE THRESHOLDING

BACKGROUND OF THE INVENTION

1. Fields of the Invention

The present invention relates to systems and methods for estimating a frequency of rarely occurring events. More particularly, the present invention relates to estimation a magnitude of rare events upon receiving a complete data sample representing past events over a time period and a specific exceedance probability.

2. Description of the Prior Art

There has been a need to estimate, on a basis of a set of observations of some physical quantities, the sizes of events or events that will be exceeded with an extremely small probability. An extremely small probability might, for example, refer to a probability less than 0.001. Rare events would then refer to events whose occurrence probabilities are less than 0.001 in a particular time period. An example of a rare event may be a wind speed that is exceeded at a specific location once every 100 years on average. A magnitude of rare events refers to the physical magnitude associated with the events, e.g. the wind speed in km/hr. In statistics, techniques are used for estimating an extreme quantile of a distribution, given a random sample of data drawn from the distribution. The extreme quantile refers to a value within a range of possible values taken by the distribution, such that either a probability that any value larger than the value will be observed or a probability that any value smaller than the value will be observed is extremely small (e.g., less than 0.001). A distribution specifies the relative frequency of occurrence of events of different magnitudes. An example of estimating an extreme quantile of a distribution is estimating a wind speed that will be exceeded at a specific location once every 100 years.

A traditional approach for estimating sizes of events that will exceed an extremely small probability (e.g., a probability less than 0.001) is to assume a particular form for the distribution, to fit the distribution to different subsets of a largest observed data values, and to choose one of these subsets which provides a "best" estimate of the extreme quantile. An observed value refers to a datum in a subset or an entire set. This traditional approach of choosing a subset providing the best estimates of extreme quantile, or equivalently choosing an appropriate threshold such that estimates of extreme quantiles are based only on data that exceed the threshold, is called "adaptive thresholding".

A criterion used to judge a quality of estimates typically evaluates whether a distribution fitted to data in a subset is correctly specified, i.e. whether a mathematical form of a distribution specifies a distribution from which the data are assumed to be drawn. For example, the criterion may be an estimated accuracy of the estimated extreme quantile under an assumption that the fitted distribution is correctly specified or a measure of the fluctuations of an estimated tail index over different subsets. A tail of a distribution refers to each end (upper end or lower end) of the distribution. A tail index is a number that specifies a mathematical form of the upper end of the distribution. An estimated tail index is an estimate, computed from a set of data, of the tail index of the distribution from which the data were drawn.

However, this traditional approach is not always accurate because a distribution from which the data are drawn may be different from a distribution assumed in a fitting process (e.g, a processing fitting a distribution to different subsets of the largest observed data values). This inaccuracy of the traditional approach can produce unreliable estimates of quantiles.

Thus, it is highly desirable to have a method and a system for choosing an optimal subset of data which increases a robustness of the fitting process and achieves consistency with smaller subsets (i.e. has the same characteristics as smaller subsets). Such method and system should further compute a quantile estimate based on the optimal subset.

SUMMARY OF THE INVENTION

The present invention describes a method, a system and a computer program product for estimating a magnitude of extremely rare events upon receiving a complete data sample and a specific exceedance probability.

In one embodiment, there is provided a computer-implemented method for estimating a magnitude of extremely rare events upon receiving a complete data sample representing past events over a time period and a specific exceedance probability, the method comprising:

choosing a distribution of the complete data sample;

fitting the distribution to subsamples of the complete data sample;

performing a goodness-of-fit test to determine whether a subsample is fitted to the distribution;

setting a subsample as an acceptable subsample, if a result of the goodness-of-fit test of the subsample is higher than a predetermined threshold; and setting a subsample as an unacceptable subsample, if the result of the goodness-of-fit test of the subsample is less than or equal to the predetermined threshold.

identifying an optimal subsample that is a largest acceptable subsample among acceptable subsamples fitted to the distribution of the complete data sample; and computing a quantile estimate based on the optimal subsample and the specified exceedance probability, the quantile estimate indicating the magnitude of the extremely rare events.

In one embodiment, there is provided a computer-implemented system for estimating a magnitude of extremely rare events upon receiving a complete data sample representing past events over a time period and a specific exceedance probability, the system comprising:

means for choosing a distribution of the complete data sample;

means for fitting the distribution to subsamples of the complete data sample;

means for performing a goodness-of-fit test to determine whether a subsample is fitted to the distribution;

means for setting a subsample as an acceptable subsample, if a result of the goodness-of-fit test of the subsample is higher than a predetermined threshold; and means for setting a subsample as an unacceptable subsample, if the result of the goodness-of-fit test of the subsample is less than or equal to the predetermined threshold, means for identifying an optimal subsample that is a largest acceptable subsample among acceptable subsamples fitted to the distribution of the complete data sample; and means for computing a quantile estimate based on the optimal subsample and the specified exceedance probability, the quantile estimate indicating the magnitude of the extremely rare events.

In a further embodiment, the goodness-of-fit test is one or more of: Chi-Square test, Kolmogorov-Smirnov test, Anderson-Darling test and Shapiro-Wilk test.

In a further embodiment, the distribution is a generalized Pareto distribution, whose cumulative distribution function is given by $Pr[X \leq x] = 1 - \{1 - k(x-\xi)/\alpha\}^{1/k}$ indicating a probability that a random variable X does not exceed an observed value x in the complete data sample, where $\xi$ is a location parameter, $\alpha$ is scale parameter, and k is a shape parameter.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

FIG. 5 illustrates quantile estimates of an optimal subsample in the exemplary embodiment of the present invention.

DETAILED DESCRIPTION

Figure 1:
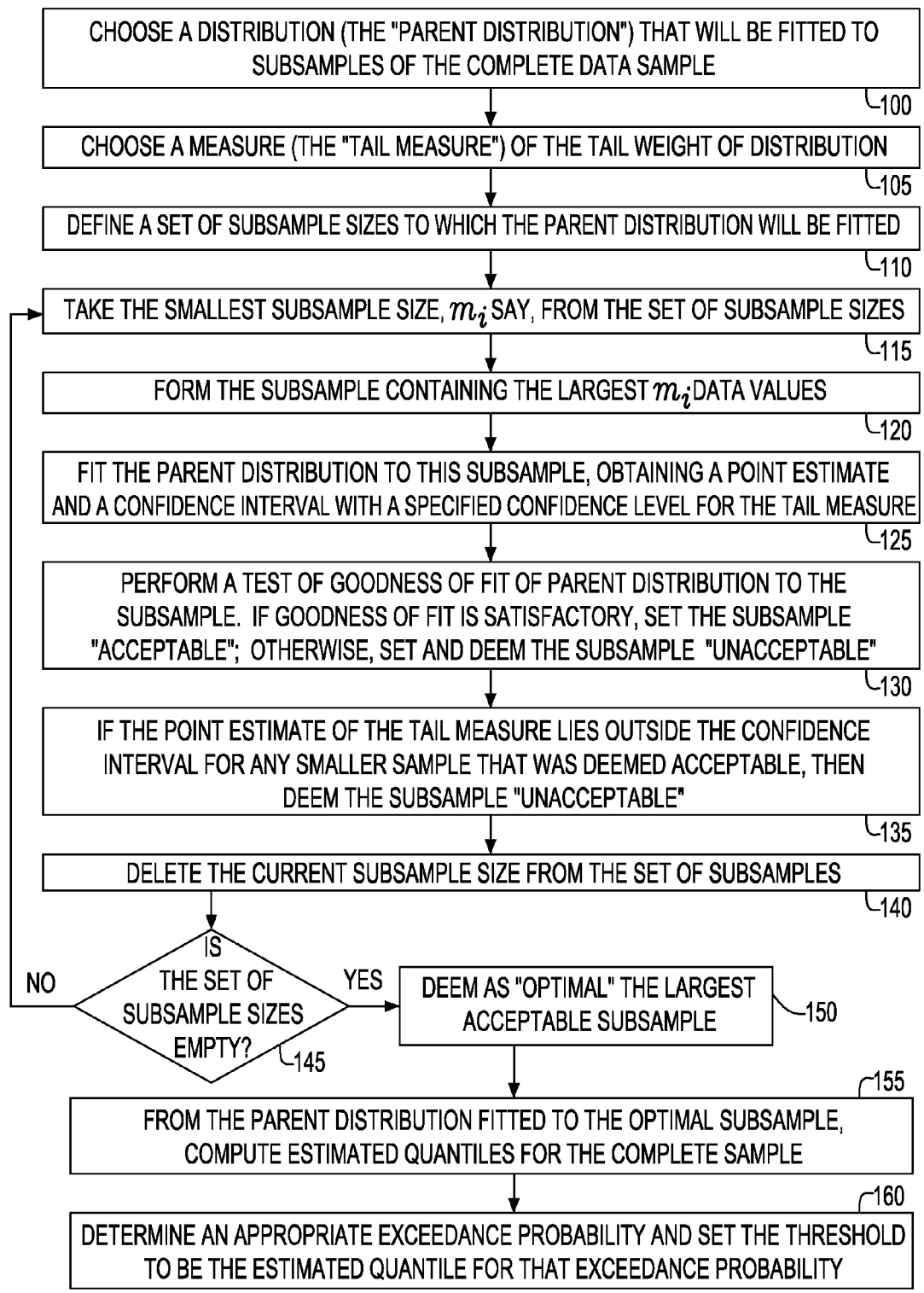
FIG. 1 illustrates a flow chart including method steps that one embodiment of the present invention employs.

A system, method and computer program product according to one embodiment of the present invention estimates a magnitude of a rare event with a specific exceedance probability given a set of data samples for magnitudes of historical events. Events in this invention refer to a set of outcomes to which a probability is assigned. An exceedance probability is for a threshold, "y", a probability that during a specific period (e.g., 1 year) a random variable in question, "Y", will exceed the y. The exceedance probability is expressed as P[Y>y]. The magnitude of the rare event with the specific exceedance probability refers to the physical measurements associated with events that occur with the specific exceedance probability. For example, a wind speed that will be exceeded at a specific location in a calendar year with a probability 0.01 is an example of the magnitude of rare event with the specific exceedance probability. The magnitude of historical events refers to magnitude of events that have occurred in the past, e.g., last week's daily maximum temperatures in ° C.

In one embodiment, the present invention employs methods for fitting a distribution to "m" largest historical events, for a range of values of m, and designating one of these sets of m historical events as "optimal". In one approach, there is considered a bias-variance tradeoff occurring when choosing the optimal value. The bias-variance tradeoff in a traditional approach refers to reducing a bias by increasing a variance and reducing the variance by increasing bias. However, the present invention reduces the bias and variance at same time. In one embodiment of the present invention the bias of an event magnitude estimate (i.e., a result of estimating the magnitude of a rare event with a specific exceedance probability) is reduced by choosing "m" so that the chosen subsample is consistent with all smaller subsamples. Thus, estimates of a tail index, a measure of the tail weight of a distribution, are not significantly different across various subsamples. While reducing the bias, this embodiment reduces the variance of the event magnitude estimate by choosing m as large as possible satisfying the consistency requirement (i.e., a chosen subsample is consistent with all smaller subsamples). A subsample refers to a subset of a complete data sample. A complete data sample refers to all data that have been observed in a past time period (e.g., last 100 years). The tail index refers to a quantitative measure of how likely a very large value (e.g., $10^{17}$) rather than a (merely) large value (e.g., $10^5$) can be observed when drawing data from a distribution. The tail weight refers to a qualitative measure of how likely a very large value rather than a (merely) large value can be observed when drawing data from a distribution.

A further embodiment of the present invention improves robustness when selecting an optimal subsample. This embodiment maintains accuracy when a distribution to which the optimal subsample is fitted is incorrect. To improve the robustness and to maintain accuracy, this embodiment performs a goodness-of-fit test of the distribution to each subsample. The goodness-of-fit test determines whether a subsample comes from a data sample with a specific distribution. e-Handbook of Statistical Methods, NIST/SEMATECH, Jul. 18, 2006, describes diverse goodness-of-fit tests such as Chi-Square test, Kolmogorov-Smirnov test, Anderson-Darling test and Shapiro-Wilk test. The e-Handbook of Statistical Methods is found at http://www.itl.nist.gov/div898/handbook/ (Date created: Jun. 1, 2003, Last update: Jul. 18, 2006). Thus, relevant descriptions of Chi-Square test, Anderson-Darling test, Kolmogorov-Smirnov test and Shapiro-Wilk test found in the e-Handbook of Statistical Methods are wholly incorporated herein by reference. A subsample that fails the goodness-of-fit test is not considered as a candidate to be an optimal subsample and is ignored when evaluating the consistency of the subsample with smaller subsamples.

One embodiment of the present invention fits a distribution (the "parent distribution") to subsamples consisting of the largest m data values, for a range of different values of m, and chooses one of these subsamples and its fitted distribution as a basis for estimating extreme quantiles. The parent distribution refers to a distribution that was originally sampled. This embodiment chooses a subsample that is as large as possible, to reduce the variability of the estimated extreme quantile. This embodiment requires that an estimate of a tail of the distribution (the "tail measure") be consistent with a corresponding estimate in all smaller subsamples, to reduce the bias caused by using a subsample so large that a mathematical form of the parent distribution is not a good approximation to the distribution of the entire subsample.

To achieve consistency, this embodiment requires that a point estimate of the tail measure should lie within confidence intervals, at fixed confidence level, for the tail measure for all smaller subsamples. However, some subsamples may not be well fitted by the parent distribution. Then, this embodiment ignores these subsamples which are not well fitted by the parent distribution. A point estimate refers to an approximate value of some parameters such as means (average) of a complete data sample from which subsamples are randomly drawn. A confidence interval is an interval in which a measurement or trial fails within a given probability. Usually, the confidence interval of an interest is symmetrically placed around the mean, so a 50% confidence interval for a symmetric probability function would be the interval [−a,a] such that $$\frac{1}{2} = \int_{-a}^{a} P(x)\,dx.$$

A confidence level is a probability value (1−t) associated with a confidence interval, where t is an error probability or error rate. The confidence level is often expressed as a percentage. For example, if t=0.05=5%, then the confidence level is equal to 1−0.05=0.95, i.e., 95% confidence level. Suppose an opinion poll predicted that, if an election were held today, a Conservative party would win 60% of the vote. A pollster might attach a 95% confidence level to the interval 60% plus or minus 3%. That is, a pollster thinks it is very likely that the Conservative party would get between 57% and 63% of a total vote.

FIG. 1 illustrates a flow chart including method steps that one embodiment of the present invention employs. At step 100, a system (e.g., a system 1600 in FIG. 2) chooses a distribution ("the parent distribution") for the complete data sample. Specifically, the system chooses a distribution that will be fitted to subsamples of the complete data sample. The complete data sample refers to all the data observed in the past during a predefined time period, e.g., daily wind speeds observed for last 100 years. The distribution may have a finite lower bound and one or more parameters that will be estimated as part of the fitting procedure (i.e., the procedure for fitting the distribution to a subsample).

In one embodiment, the system selects a generalized Pareto distribution to represent the distribution to which subsamples are to be fitted. A generalized Pareto distribution is a continuous probability distribution which is bounded below and unbounded above. The cumulative distribution function of the generalized Pareto distribution is given by $F(x)=P[X \leq x] = 1-\{1-k(x-\xi)/\alpha\}^{1/k}$ representing a probability that a random variable X does not exceed an observed value x, where $\xi$ is a location parameter having a negative or positive value, $\alpha$ is scale parameter, k is a shape parameter. The probability density function of the generalized Pareto distribution is given by $\alpha^{-1}\{1-k(x-\xi)/\alpha\}^{1/k-1}$, $x \geq \xi$.

The location parameter is a parameter determining where the origin of the distribution will be located. A probability density function $f_\xi(x)=f(x-\xi)$, where $\xi$ is called the location parameter and x is a datum in the distribution. If $\xi$ is positive, the origin of the distribution is shifted to the right. If $\xi$ is negative, the origin of the distribution is shifted to the left. The scale parameter is one of numerical parameters in probability distributions. The larger the scale parameter, the more spread out the distribution. A probability density function $f_\alpha(x)=f(x/\alpha)/\alpha$, where f is a probability density function, $\alpha$ is called a scale parameter, a value of $\alpha$ determines the scale of the probability distribution, and x is a datum in the probability distribution. If $\alpha$ is large, then the distribution will be more spread out; if $\alpha$ is small, then it will be more concentrated. A shape parameter is a parameter that affects a shape of a distribution rather than simply shifting it (as a location parameter does) or stretching/shrinking it (as a scale parameter does).

The quantile function of the generalized Pareto distribution, an inverse of the cumulative distribution function, is $$Q(u) = \xi + \frac{\alpha}{k}\{1 - (1-u)^k\},$$

where u is a value between 0 and 1. The quantile function has a lower limit of $\xi$ and an upper limit of $\xi+\alpha/k$ when k is larger than 0.

In the generalized Pareto distribution, the cumulative distribution function has a power law form: 1−F(x) in proportion with $x^{-1/B}$ (i.e., $1-F(x) \propto x^{-1/B}$) for large x (e.g., $x>10^5$). B is the tail index of the distribution. A power law is a polynomial that exhibits a property of scale invariance (i.e., a feature of objects or laws that do not change if scales (e.g., length or energy) of the objects or laws are multiplied by a common factor (e.g., a constant)). The most common power law relates two variables and have a form of $f(x)=ax^k+o(x^k)$, where a and k are constants and $o(x^k)$ is asymptotic upper bound of $x^k$. Here, k is typically called a scaling exponent, denoting a fact that a power law function satisfies a criterion $f(cx) \propto f(x)$ where c is a constant, and x is a datum in a distribution.

In a further embodiment, the generalized Pareto distribution is used for modeling exceedances over thresholds. The generalized Pareto distribution can be utilized in many fields requiring data analysis such as environmental data, insurance loss, financial data and internet traffic modeling.

Returning to FIG. 1, at step 105, the system chooses a measure ("tail measure") of tail weight of the distribution (i.e., generalized Pareto distribution and/or parent distribution). The tail measure is related to a form of the parent distribution in its upper tail (i.e., an upper end of the parent distribution). In one embodiment, the tail measure is a specific quantile (a specific quantile is appropriate if an estimation of an event magnitude at a specific exceedance probability is of primary interest) or a more general measure of the tail weight of the distribution, such as a tail index of the distribution or a shape parameter of the parent distribution.

At step 110, the system defines a set of subsample sizes to which the parent distribution will be fitted. A practical recommendation is to use a set of values ranging, for example, from 50 to one quarter of a size of the complete data sample, with adjacent values separated by 10% difference. In one embodiment, all subsample sizes can be used, but estimates (e.g., quantile estimates) from small subsamples are likely to have wide confidence intervals and estimates from subsamples with similar sizes are unlikely to differ by much. Thus, using only a small fraction of all subsample sizes saves a lot of computing effort while making very little difference on a final result (e.g., a frequency of rare events). A quantile estimate refers to an estimate of the magnitude of an event, such that said magnitude will be exceeded with a specified frequency of occurrence.

Figure 3:
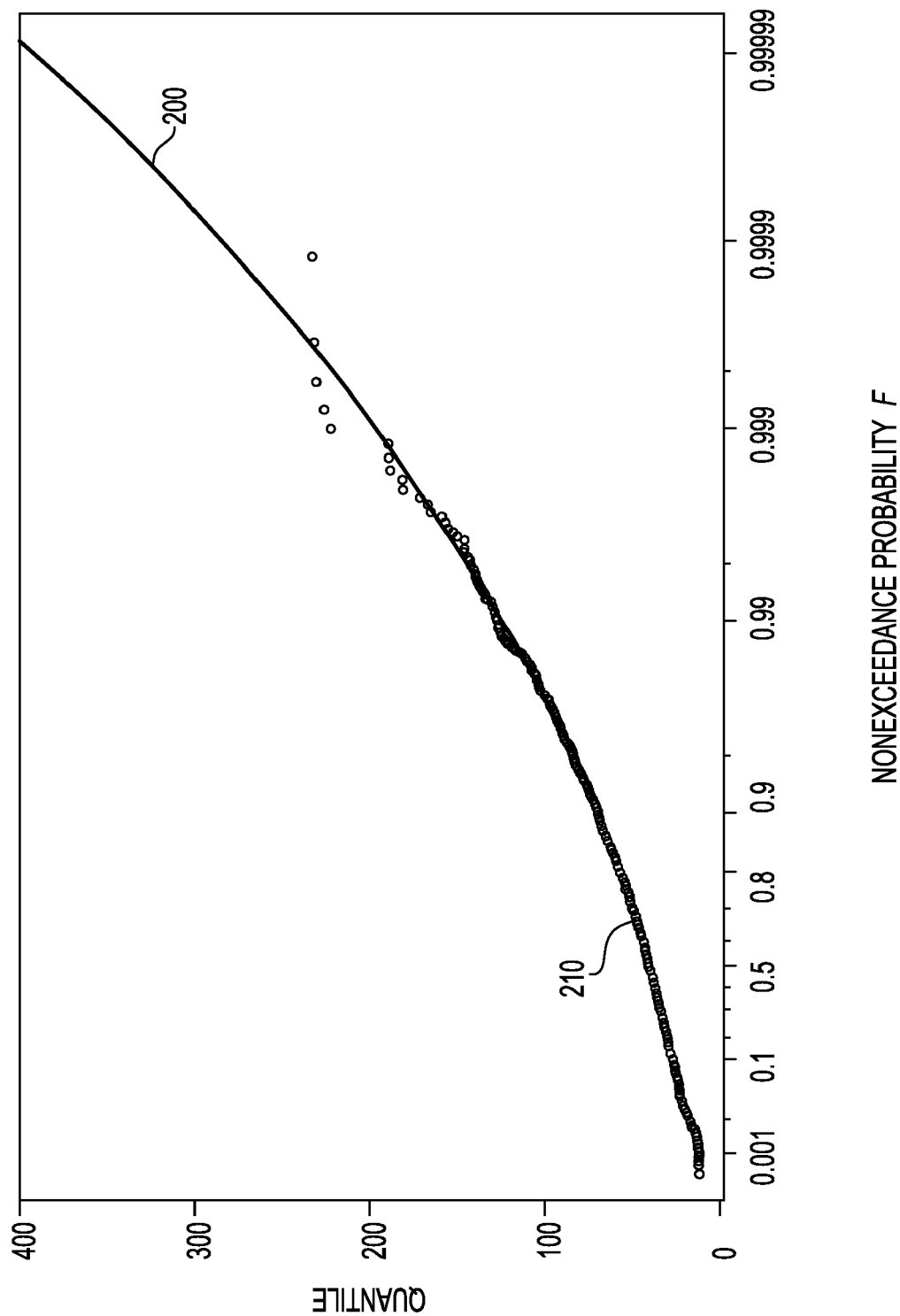
FIG. 3 illustrates a distribution fitted to an optimal subsample in one exemplary embodiment of the present invention.

At step 115, the system takes a smallest subsample size, $m_i$, from the set of subsample sizes. At step 120, for each subsample whose size is $m_i$, the system forms a subsample containing the $m_i$ largest data values. At step 125, the system graphically or mathematically fits the parent distribution to this subsample (i.e., a subsample whose size is $m_i$), obtaining a point estimate $k_i$ and a confidence interval $[L_i, U_i]$ with a specific confidence level $\gamma$ for the tail measure. For example, FIG. 3 illustrates a parent distribution 200 is graphically fitted to a subsample 210. In one embodiment, the confidence level is 99%. A fairly high level of the confidence level (e.g., 99% confidence level) needs to be chosen, in order to reduce a likelihood that a small subsample with an aberrant tail measure estimate might yield a confidence interval that would conflict with tail measure estimates from larger subsamples, causing presumably more accurate tail measure estimates from the larger subsamples to be rejected. The aberrant tail measure estimate refers to a tail measure estimate whose numerical value is markedly different from a tail measure estimate obtained from neighboring (in order of sizes) subsamples.

At step 130, for each subsample (subsample whose size is $m_i$), the system performs a goodness-of-fit test to determine whether the subsample is fitted to the distribution. If a result of the goodness-of-fit test of the subsample size $m_i$ is satisfactory, then the system sets $G_i=1$ and sets the subsample as "acceptable"; otherwise sets $G_i=0$ and sets the subsample as "unacceptable". $G_i$ refers to a result of a goodness-of-fit test.

In one embodiment, $G_i$ is a Boolean value indicating whether the result is satisfactory (i.e., $G_i=1$) or unsatisfactory ($G_i=0$). In a further embodiment, to determine whether the result of the goodness-of-fit test is satisfactory or not, the system provides a predetermined threshold (e.g., P-value=0.05). A P-value is an output of the goodness-of-fit test. For example, if the P-value of a subsample is less than or equal to 0.05, then the subsample is determined to be not well fitted by the distribution (i.e., unsatisfactory). Otherwise, the subsample is determined to be well fitted by the distribution (i.e., satisfactory). Generally speaking, if the P value of a subsample is too small (e.g., less than 0.05), the subsample is determined to be not well fitted by the distribution.

At step 135, the system estimates a tail weight of the subsample. If the point estimate of a tail measure was obtained at step 125, the system can consider the point estimate of tail measure as an estimated tail weight. The system evaluates whether the estimated tail weight of the subsample lies outside a confidence interval for any smaller subsample that was deemed acceptable. The system sets the subsample as an unacceptable subsample, if the estimated tail weight of the subsample lies outside of the confidence interval for any smaller acceptable subsample. In other words, for a point estimate $k_i$ of a subsample, the subsample of size $m_i$ is acceptable if $G_i=1$ and $k_i \geq \max\{L_j; j<i, G_j=1\}$ and $k_i \leq \min\{U_j; j<i, G_j=1\}$. $k_i \geq \max\{L_j; j<i, G_j=1\}$ refers that $k_i$ should be at least as large as the largest value $L_j$ for which j is less than i and $G_j$ is equal to 1. $L_j$ refers to a lower limit of a confidence interval for a tail measure computed from a subsample whose size is less than $m_i$. $G_j$ refers to a result of a goodness-of-fit test of a subsample whose size is less than $m_i$. $k_i \leq \min\{U_j; j<i, G_j=1\}$ refers that $k_i$ should be at least as small as the smallest value $U_j$ for which j is less than i and $G_j$ is equal to 1. $U_j$ refers to an upper limit of a confidence interval for a tail measure computed from a subsample whose size is less than $m_i$.

At step 140, the system deletes a current subsample size ($m_i$) from the set of subsample sizes. At step 145, the system evaluates whether the set of subsample sizes is empty. If the set is not empty, the system repeats steps 115-145 until the set becomes empty or all the subsample sizes, which were defined at step 110, are considered.

If the set is empty or all the subsample sizes are considered, at step 150, the system sets a largest acceptable subsample as an optimal subsample. The optimal subsample has a largest size among acceptable subsamples. A size of a subsample refers to the number of data values in the subsample.

At step 155, the system computes a quantile estimate for the optimal subsample. The quantile estimate refers to a fraction or percentage of points below a given value. For example, 0.3 (30%) quantile is a point at which 30% of data fall below and 70% fall above the point. In this invention, the quantile estimate is equivalent to a frequency of rare events in the optimal subsample or the distribution. In one embodiment, the system computes the quantile estimate based on the optimal subsample and a specific exceedance probability, which is provided as an input or is predetermined before executing the steps 100-160 in FIG. 1. The quantile estimate for an exceedance probability $\delta$ is $Q(1-n\delta/m_{opt})$, where n is a size of the complete data sample (i.e., the number of data in the complete data sample), $m_{opt}$ is the size of the optimal subsample, Q is quantile function of the distribution. In the generalized Pareto distribution, $$Q(u) = \xi + \frac{\alpha}{k}\{1-(1-u)^k\},$$

where $\xi$ is a location parameter, $\alpha$ is scale parameter, k is a shape parameter. The location parameter, scale parameter and shape parameter can be estimated from the optimal subsample, e.g., by using L-moments. L-moments are linear combinations of probability weighted moments that have measures of a location, scale and shape of data. For a probability distribution with a cumulative distribution function F(x), the probability weighted moments are defined by $\beta_r = \int x\{(F(x))\}^r dF(x)$, where r=0,1,2, . . . and "x" is a datum or an observed value in a subsample. L-moments are defined in terms of the probability weighted moments: A first L-moment is defined by $\lambda_1=\beta_0$. A second L-moment is defined by $\lambda_2=2\beta_1-\beta_0$. A third L-moment is defined by $\lambda_3=6\beta_2-6\beta_1+\beta_0$. A fourth L-moment is defined by $\lambda_4=20\beta_3-30\beta_2+12\beta_1-\beta_0$. L-moment ratios are defined by $\tau_r=\lambda_r/\lambda_2$. L-moments are also described in J. R. M. Hosking, "L-moments: Analysis and Estimation of Distributions Using Linear Combinations of Order Statistics" (hereinafter "Hosking"), Journal of the Royal Statistical Society, Series B, 52, 105-124 (1990), which is wholly incorporated by reference herein. In another embodiment, the parameters are obtained from the optimal subsample by using maximum likelihood estimation or graphical estimation. The above-incorporated e-Handbook of Statistical Methods, NIST/SEMATECH, Jul. 18, 2006, describes maximum likelihood estimation and graphical estimation.

Further in FIG. 1, at step 160, the system sets the quantile estimate as a threshold. The system determines a corresponding exceedance probability as an appropriate exceedance probability for the quantile estimate. If the magnitude of an observed event exceeds the threshold, the event is determined as an unusual or rare event.

Following is a usage example of method steps in FIG. 1. Data are response time for transactions in an exemplary online banking application that collects 4688 data points during a single normal day.

A distribution is chosen to be a generalized Pareto distribution, with quantile function $$Q(u) = \xi + \frac{\alpha}{k}\{1-(1-u)^k\},$$

where $\xi$ is a location parameter, $\alpha$ is scale parameter, k is a shape parameter. A tail measure of the distribution is the shape parameter k of the generalized Pareto distribution. The generalized Pareto distribution is fitted to subsamples of sizes between 50 and 1172 (i.e., 25% of the complete sample), each subsample being approximately 10% larger than the next smallest subsample. The parameters of the distribution are estimated by the methods of L-moments. Estimating the parameters of the distribution by using L-moments is described in Hosking. Whether a subsample is fitted to the distribution (i.e., Goodness-of-fit) is evaluated by using a test (e.g., Chi-square test) based on L-moments: the first two L-moments of a subsample are used to estimate the parameters, the test measures a closeness of the third and fourth L-moments of the subsample to the corresponding population L-moments (i.e., L-moments of the distribution).

FIG. 3 illustrates a graph of quantiles (vertical axis) vs. nonexceedance probabilities (horizontal axis) associated with response times for the example set of 4688 online banking transactions in the provided example. A horizontal axis in FIG. 3 represents the nonexceedance probability. A nonexceedance probability is a probability that a datum has equal to or less than an assigned value. The nonexceedance probability is calculated by successively summing probability starting from the lowest value 0 to a probability associated with the assigned value $$\text{(i.e., } P(X \le x_i) = \sum_{j=1}^{i} p(x_j)\text{),}$$

where X is a random variable, $x_i$ is an assigned value). A vertical axis in FIG. 3 represents a quantile corresponding to a nonexceedance probability. The continuous line 200 in FIG. 3 is a generalized Pareto distribution fitted to an optimal subsample 210.

Figure 4:
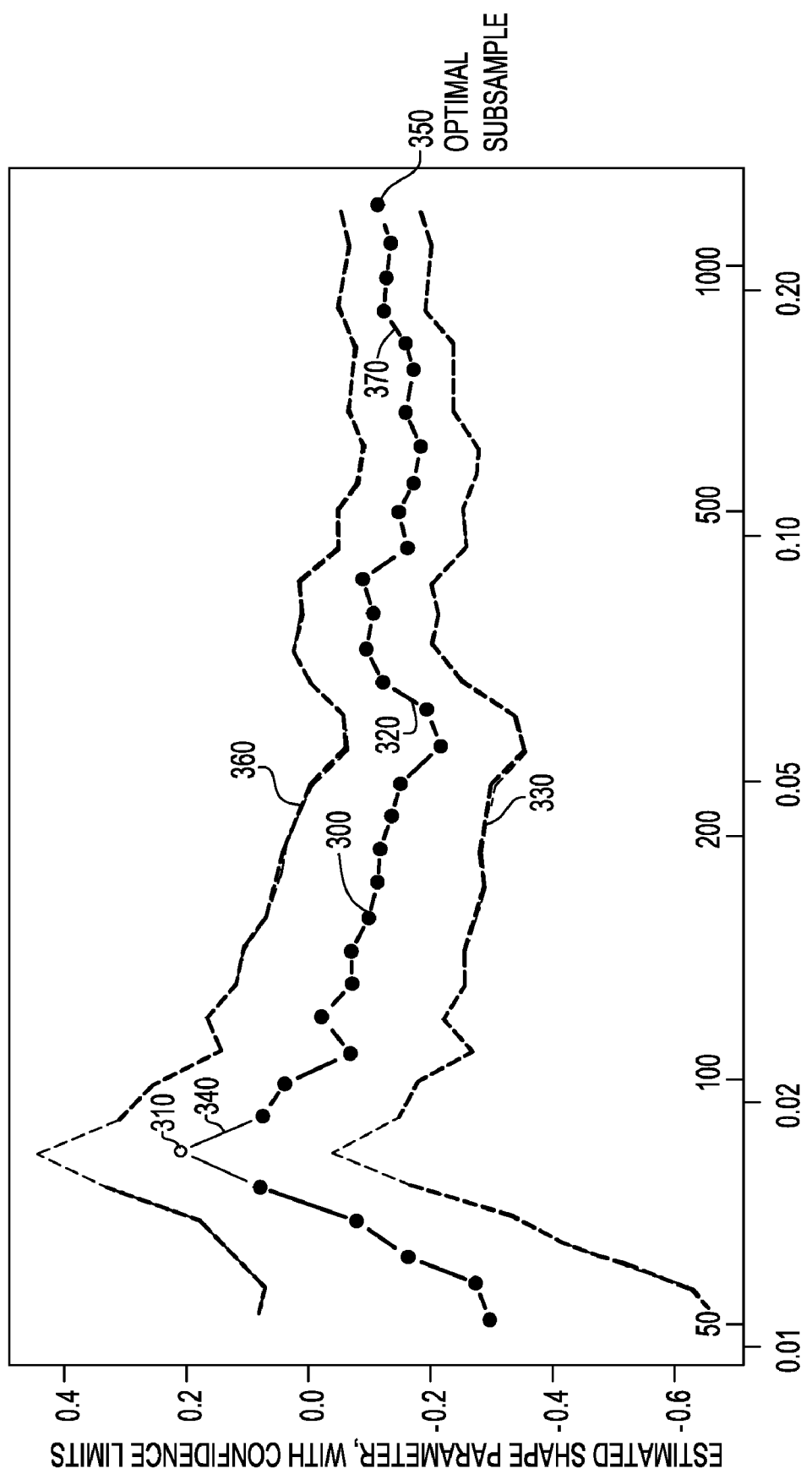
FIG. 4 illustrates tail measures of subsamples in the exemplary embodiment of the present invention.

FIG. 4 illustrates exemplary plots of point estimates and confidence intervals for the shape parameters. An upper perforated line 360 and a lower perforated line 330 indicate the endpoints of confidence intervals for the shape parameter for different subsample sizes. Dots (e.g., a dot 300) and circles (e.g., a circle 310) in a middle perforated line 370 indicate point estimates of estimated shape parameters for subsamples to which the generalized Pareto distribution gave a satisfactory or unsatisfactory fit. In FIG. 4, dots (e.g., a dot 300) and black lines (e.g., 320) indicate that the generalized Pareto distribution provided a satisfactory fit to corresponding subsamples. Circles (e.g., a circle 310) and gray lines (e.g., a line 340) indicate that the generalized Pareto distribution provided an unsatisfactory fit to corresponding subsample(s). A dot which indicates a largest acceptable subsample is marked as an optimal subsample 350. The middle perforated line 370 joins point estimates of the shape parameters for different subsample sizes.

In this exemplary scenario providing 4688 data points, the results of performing method steps 100-160 are shown in FIG. 5. FIG. 5 illustrates a table including sizes of subsamples, parameters, confidence intervals, P-values, results of goodness-of-fit tests and quantile estimates. Each row in FIG. 5 illustrates results for one subsample. Columns are: p, subsample size expressed as a proportion of 4688 (size of complete data sample); n, subsample size ($m_i$ at the step 115 in FIG. 1); $\xi$, $\alpha$, k, parameters of generalized Pareto distribution fitted to subsample(s); U, L, endpoints of confidence intervals for shape parameters (U and L are obtained at step 125 in FIG. 1); G, P-value, a result of goodness-of-fit test (P-value is obtained at step 130 in FIG. 1); Fit, indicator of satisfactory (1) or unsatisfactory (0) fit (indication of whether a subsample is fitted to the distribution or not); Qn, estimated quantile of exceedance probability $10^{-n}$ (e.g., Q3, estimated quantile of exceedance probability $10^{-3}$). In this example, shape parameter estimates are very stable for subsample sizes larger than 150 and the optimal subsample size is the largest used, 1172: FIG. 4 illustrates the shape parameter estimates for the described example are around between −0.1 and −0.2 for subsample sizes larger than 150. FIG. 5 also illustrates the shape parameter estimates (k) are between −0.092 and −0.208 when subsample sizes (n) are larger than 150.

Returning to FIG. 3, there is illustrated the generalized Pareto distribution 200 being fitted to the optimal subsample 210 whose subsample size is 1172. FIG. 3 shows that there is an agreement between the data and the fitted curve, except for quantile values between about 120 and 130 and except for an extreme tail of data where subsample quantiles have variability. For only one subsample with size 81, the fit to the generalized Pareto distribution was unsatisfactory: FIG. 5 shows that "Fit" is 0 for a subsample size 81. If this subsample were not excluded because of its unsatisfactory fit, a lower endpoint of its confidence interval would influence a choice of the optimal subsample, which, for example, would be chosen as the subsample with size 119: A point estimate of a tail measure of the optimal subsample (k) is −0.119, which is less than a lower bound of a confidence interval of a subsample size 81, which is −0.038. By excluding the subsample with the size 81, the k value of the optimal subsample resides between a lowest bound of any smaller acceptable subsample (−0.147) and a highest bound of any smaller acceptable subsample (0.328). The estimated quantiles (quantile estimate) for the subsamples of size 119 and 1172 are noticeably different, particularly for exceedance probabilities of $10^{-5}$ and $10^{-6}$: Q5 value of a subsample size 119 is 349, Q5 value of a subsample size 1172 is 411, Q6 value of a subsample size 119 is 433, Q6 value of a subsample size 1172 is 573. Thus, FIG. 5 cannot prove that a larger subsample generates more accurate quantile estimates. However, based on FIG. 3 where there is an agreement between a distribution and data in the optimal subsample, it can be deduced that a larger subsample provides more accurate estimated quantile (quantile estimate). In this example, Q3 value (a quantile estimate for an exceedance probability $10^{-3}$) is obtained by executing $$Q(1 - n\delta/m_{opt}) = Q(1 - 10^{-3}/p) = Q(1 - 10^{-3}/0.25) = Q(0.996) =$$

$$\xi + \frac{\alpha}{k}\{1 - (1 - 0.996)^k\} = 54.1 - \frac{18.1}{0.119}\{1 - (1 - 0.996)^{-0.119}\} = 196.$$

Q4 and Q5 values are obtained in a same manner that the Q3 value is obtained.

Figure 2:
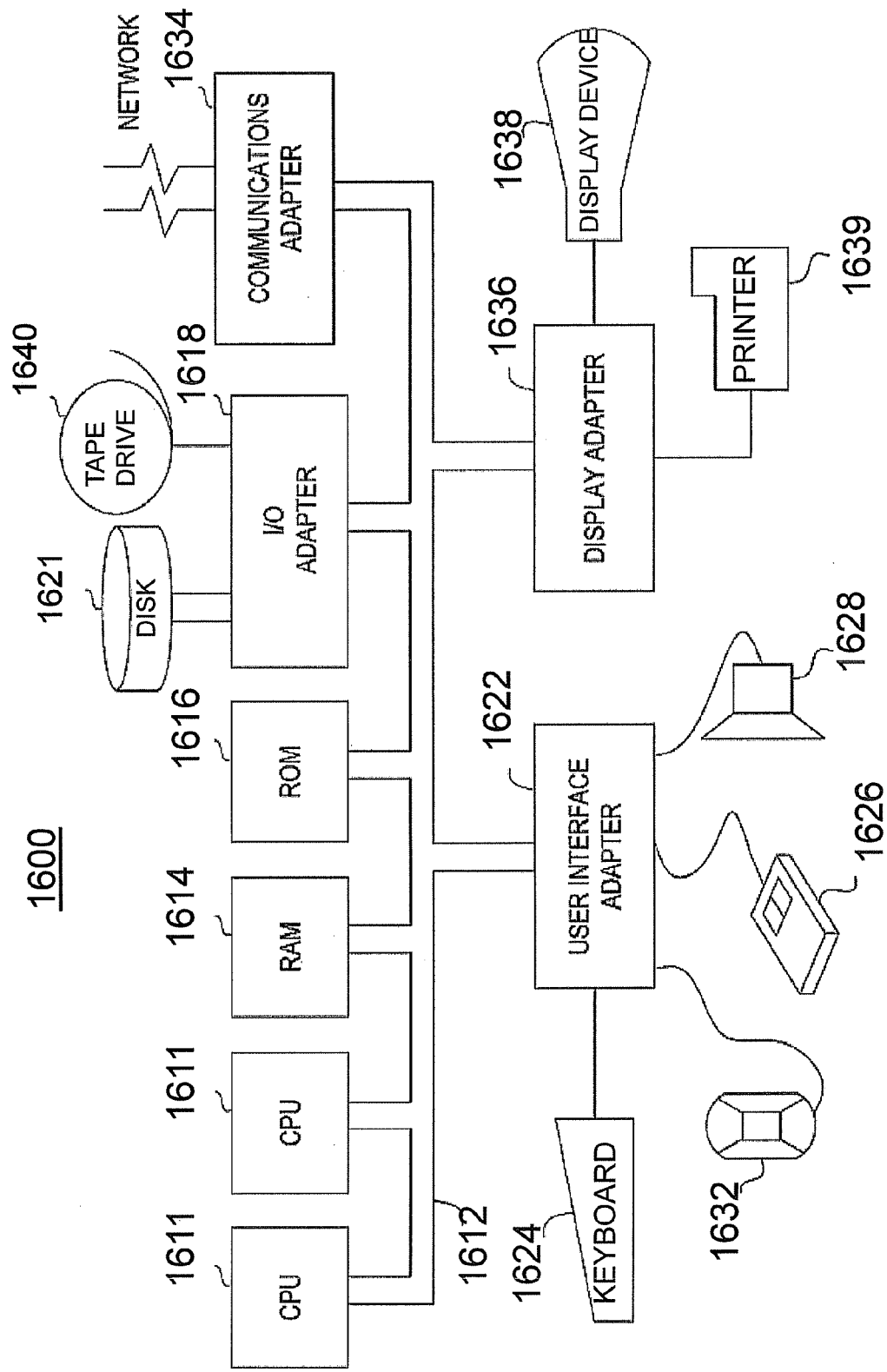
FIG. 2 illustrates a system diagram in one embodiment of the present invention.

FIG. 2 illustrates a hardware configuration of a computing system 1600 executing the method steps in FIG. 1. The hardware configuration preferably has at least one processor or central processing unit (CPU) 1611.

The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

Although the embodiments of the present invention have been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented on a computer readable medium (e.g., a compact disc, a digital versatile disc, a hard disk, an optical disk, a solid state drive, etc.) embodying computer program instructions (e.g., C++, C, Java, .Net, Assembly languages, binary code, etc.) being executed by a processor (e.g., IBM® PowerPC®, SUN® Sparc®, etc.) for causing a computer (e.g., a desktop, a laptop, a server, etc.) to perform one or more functions of this invention. The present invention further includes a method of deploying a computer program product including a program of instructions in a computer readable medium for one or more function of this invention, wherein, when the program of instructions is executed by a processor, the computer program product performs the one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for estimating a magnitude of extremely rare events upon receiving a complete data sample representing past events over a time period and a specific exceedance probability, the method comprising:
    choosing, by a computing system including at least one memory device and at least one processor connected to the at least one memory device, a distribution of the complete data sample;
    fitting, by the computing system, the distribution to subsamples of the complete data sample;
    performing, by the computing system, a goodness-of-fit test to determine whether a subsample is fitted to the distribution;
    setting, by the computing system, a subsample as an acceptable subsample, if a result of the goodness-of-fit test of the subsample is higher than a predetermined threshold;
    estimating, by the computing system, a tail weight of the acceptable subsample;
    evaluating, by the computing system, whether the estimated tail weight of the acceptable subsample lies outside a confidence interval of a subsample that is smaller than the acceptable subsample and that is fitted to the distribution;
    setting, by the computing system, the acceptable subsample as an unacceptable subsample, if the estimated tail weight of the acceptable subsample lies outside the confidence interval;
    setting, by the computing system, a subsample as the unacceptable subsample, if the result of the goodness-of-fit test of the subsample is less than or equal to the predetermined threshold;
    identifying, by the computing system, an optimal subsample that is a largest acceptable subsample among acceptable subsamples fitted to the distribution of the complete data sample; and
    computing, by the computing system, a quantile estimate based on the optimal subsample and the specific exceedance probability, the quantile estimate indicating the magnitude of the extremely rare events.

2. The computer-implemented method according to claim 1, wherein the goodness-of-fit test is one or more of:
    Chi-Square test, Kolmogorov-Smirnov test, Anderson-Darling test and Shapiro-Wilk test.

3. The computer-implemented method according to claim 1, further comprising:
    choosing, by the computing system, a measure of a tail weight of the distribution;
    defining, by the computing system, a set of subsample sizes to which the distribution is to be fitted; and
    forming, by the computing system, a subsample containing m largest data values, for each subsample whose size is m.

4. The computer-implemented method according to claim 3, wherein the measure of the tail weight is chosen from one or more of: a specific quantile, a tail index or a shape parameter of the distribution.

5. The computer-implemented method according to claim 3, wherein the subsample sizes ranges from 50 to ¼ of size of the complete data sample with adjacent values having 10% difference.

6. The computer-implemented method according to claim 3, further comprising:
    obtaining, by the computing system, a confidence interval with a specific confidence level for the measure of the tail weight of the distribution; and
    repeating, by the computing system, the forming, the fitting, the obtaining, the performing the goodness-of-fit test, the setting a subsample as an acceptable subsample, the setting a subsample as an unacceptable subsample, the estimating, the evaluating, and the setting the acceptable subsample as an unacceptable subsample, until all the subsample sizes in the set are considered.

7. The computer-implemented method according to claim 1, wherein the distribution is a generalized Pareto distribution, whose cumulative distribution function is given by $\Pr[X \leq x] = 1 - \{1 - k(x - \xi)/\alpha\}^{1/k}$ indicating a probability that a random variable X does not exceed an observed value x in the complete data sample, where $\xi$ is a location parameter, $\alpha$ is scale parameter, and k is a shape parameter.

8. The computer-implemented method according to claim 7, wherein the quantile estimate is computed by $$\xi + \frac{\alpha}{k}\{1 - (1-u)^k\},$$

where u is an observed value in the optimal subsample.

9. The computer-implemented method according to claim 8, wherein the location parameter, the scale parameter and the shape parameter are obtained from the optimal subsamples by using L-moments, maximum likelihood estimation or graphical estimation.

10. A non-transitory computer readable medium embodying computer program instructions being executed by a processor for causing a computer to estimate an occurrence probability of extremely rare events upon receiving a complete data sample and a specified exceedance probability, said computer program instructions comprising the steps of claim 1.

11. A method of deploying a computer program product including a program of instructions in a non-tranitory computer readable medium for estimating an occurrence probability of extremely rare events upon receiving a complete data sample and a specified exceedance probability, wherein, when the program of instructions is executed by a processor, the computer program product performs the steps of claim 1.

12. A computer-implemented system for estimating a magnitude of extremely rare events upon receiving a complete data sample representing past events over a time period and a specific exceedance probability, the system comprising:
    at least one memory device;
    at least one processor connected to the at least one memory device,
    wherein the processor is configured to:
        choose a distribution of the complete data sample;
        fit the distribution to subsamples of the complete data sample;
        perform a goodness-of-fit test to determine whether a subsample is fitted to the distribution;
        set a subsample as an acceptable subsample, if a result of the goodness-of-fit test of the subsample is higher than a predetermined threshold;
        estimate a tail weight of the acceptable subsample;
        evaluate whether the estimated tail weight of the acceptable subsample lies outside a confidence interval of a subsample that is smaller than the acceptable subsample and that is fitted to the distribution;
        set the acceptable subsample as an unacceptable subsample, if the estimated tail weight of the acceptable subsample lies outside the confidence interval;
        set a subsample as the unacceptable subsample, if the result of the goodness-of-fit test of the subsample is less than or equal to the predetermined threshold;
        identify an optimal subsample that is a largest acceptable subsample among acceptable subsamples fitted to the distribution of the complete data sample; and
        compute a quantile estimate based on the optimal subsample and the specified specific exceedance probability, the quantile estimate indicating the magnitude of the extremely rare events.

13. The computer-implemented system according to claim 12, wherein the goodness-of-fit test is one or more of:
    Chi-Square test, Kolmogorov-Smirnov test, Anderson-Darling test and Shapiro-Wilk test.

14. The computer-implemented system according to claim 12, wherein the processor is further configured to:
    choose a measure of a tail weight of the distribution;
    define a set of subsample sizes to which the distribution is to be fitted; and
    form a subsample containing m largest data values, for each subsample whose size is m.

15. The computer-implemented system according to claim 14, wherein the measure of the tail weight is chosen from one or more of: a specific quantile, a tail index or a shape parameter of the distribution.

16. The computer-implemented system according to claim 14, wherein the subsample sizes ranges from 50 to ¼ of size of the complete data sample with adjacent values having 10% difference.

17. The computer-implemented system according to claim 14, wherein the processor is further configured to:
    obtain a confidence interval with a specific confidence level for the measure of the tail weight of the distribution,
    and the processor is repeatedly configured to form a subsample, fit the distribution, obtain the confidence interval, perform the goodness-of-fit test, set a subsample as an acceptable subsample, set a subsample as an unacceptable subsample, estimate a tail weight, evaluate whether the estimated tail weight of the acceptable subsample lies outside the confidence interval, and set the acceptable subsample as an unacceptable subsample, until all the subsample sizes in the set are considered.

18. The computer-implemented system according to claim 12, wherein the distribution is a generalized Pareto distribution, whose cumulative distribution function is given by $\Pr[X \leq x] = 1 - \{1 - k(x - \xi)/\alpha\}^{1/k}$ indicating a probability that a random variable X does not exceed an observed value x in the complete data sample, where $\xi$ is a location parameter, $\alpha$ is scale parameter, and k is a shape parameter.

19. The computer-implemented system according to claim 18, wherein the quantile estimate is computed by $$\xi + \frac{\alpha}{k}\{1 - (1-u)^k\},$$

where u is an observed value in the optimal subsample.

20. The computer-implemented system according to claim 19, wherein the location parameter, the scale parameter and the shape parameter are obtained from the optimal subsamples by using L-moments.

* * * * *